United States Patent [19]

Dimigen et al.

[11] Patent Number: 4,525,417
[45] Date of Patent: Jun. 25, 1985

[54] CARBON-CONTAINING SLIDING LAYER

[75] Inventors: Heinz Dimigen; Hubertus Hübsch, both of Hamburg, Fed. Rep. of Germany

[73] Assignee: U.S. Philips Corporation, New York, N.Y.

[21] Appl. No.: 469,363

[22] Filed: Feb. 24, 1983

[30] Foreign Application Priority Data

Feb. 27, 1982 [DE] Fed. Rep. of Germany ....... 3207096
Dec. 15, 1982 [DE] Fed. Rep. of Germany ....... 3246361

[51] Int. Cl.³ .................... B32B 15/04; C23C 15/00
[52] U.S. Cl. ............................... 428/244; 204/192 C; 204/192 SP; 427/249; 427/250; 428/457
[58] Field of Search ...................... 428/244, 457, 698; 427/249, 250; 204/192 C, 192 SP

[56] References Cited

U.S. PATENT DOCUMENTS 4,289,822  9/1981  Shimada et al. ............... 428/698 X
4,293,512 10/1981  Luhleich et al. ............... 428/698 X Primary Examiner—Thomas J. Herbert
Attorney, Agent, or Firm—Rolf E. Schneider

[57] ABSTRACT

A workpiece comprises a substrate having a sliding surface provided with a friction-reducing coating. Such coating consists essentially of elemental carbon dispersed in a matrix formed of at least one metallic element in the proportions of 50.1 to 99.1 at % of the elemental carbon and 0.1 to 49.9 at % of the metallic element. The ratio of the metallic element to the elemental carbon differs from the stoichiometric ratio of the carbide.

12 Claims, 1 Drawing Figure

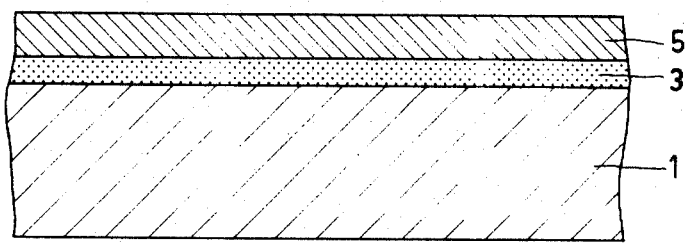

CARBON-CONTAINING SLIDING LAYER

This invention relates to a carbon-containing sliding layer or coating between surfaces moving against each other or on each other (sliding surfaces) as well as to methods of manufacturing such layers.

In order to reduce the frictional resistance of fixed sliding surfaces, lubricants are used which reduce detrition of material and energy consumption.

In the friction of fixed sliding surfaces the frictional force or tangential force K depends on the coefficient of sliding friction $\mu$ of the sliding surfaces and the load P with which the sliding surfaces rub on each other or against each other:

$$K = \mu \cdot P.$$

A sliding surface is to be understood to mean a surface of a workpiece which slides on an opposing surface of another workpiece under a given pressure force.

The coefficient of sliding friction $\mu$ depends on the roughness of the rubbing surfaces, in the case of smooth surfaces, however, on the combination of materials, thus on the materials of the sliding surfaces, as well as on the ambient atmosphere.

It is known to vary the coefficient of sliding friction of dry friction by coating the sliding surfaces with different substances so as to reduce the friction and to reduce the detrition of the rubbing surfaces.

On the basis of their material properties, the known solid lubricants used for this purpose form different groups:
1. Substances which on the basis of a layered crystal structure have good sliding friction properties, for example, graphite or the chalcogenides of metals such as molybdenum, tungsten and niobium;
2. Ductile metals, for example, gold, silver, lead or tin;
3. Materials of greater hardness, for example, borides, silicides, nitrides or, carbides.

Such materials may be provided loose between the sliding surfaces or be fixed on the sliding surfaces in the form of thin layers by means of methods commonly used in thin layer technology, for example, vapour deposition in a vacuum or cathode sputtering.

All these solid lubricants have their special advantages and their disadvantages.

A particular disadvantage of graphite as a solid lubricant is that although under normal atmospheric conditions it has a low coefficient of sliding friction ($\mu \approx 0.1$ to 0.2), which is desired, in a dry atmosphere it shows a considerably increased coefficient of sliding friction ($\mu \approx 0.8$). The result is that the detrition of the rubbing surfaces in a dry atmosphere is great, since graphite is a very soft material, i.e. is little wear-resistant, and moreover the friction is increased by the increased coefficient of sliding friction of graphite.

Friction problems at temperatures which are not very high can readily be solved by the use of chalcogenides of the indicated kind, but the use of these materials presents problems at higher temperatures. MoS$_2$ decomposes in air at temperatures above 400° C. Such chemical instability hence restricts the use of materials which in principle would readily be suitable as solid lubricants. Moreover, MoS$_2$, in contrast with graphite, has a very low coefficient of sliding friction ($\mu \approx 0.04$) in a dry atmosphere, but under normal atmospheric conditions the coefficient of sliding friction $\mu$ increases to approximately 0.2.

A general disadvantage of materials having a layered structure—which applies to both graphite and to MoS$_2$—is moreover their insufficient wear resistance as well their low hardness.

Ductile metals, for example, gold, silver, lead and tin, are good solid lubricants since these materials have comparatively low coefficients of sliding friction ($\mu \approx 0.2$ to 0.4). However, since these metals are very soft—which property on the other hand gives them their good sliding properties—they, too, have a low wear resistance.

In order to obtain layers of higher wear resistance, materials of greater hardness, for example, silicides, borides, nitrides and carbides, have been used on sliding surfaces.

It has been found that, although with these materials of greater hardness a good wear resistance can be achieved, the coefficients of sliding friction have values ($\mu \approx 0.3$ to 0.7) considerably above the values of the materials which can readily be used as solid lubricants due to their low coefficients of sliding friction, graphite ($\mu \approx 0.1$ to 0.2) or molybdenum sulphide MoS$_2$ ($\mu \approx 0.04$).

Of particularly great technical importance are frictionally engaged combinations in which steel parts slide on each other without or with insufficient hydrodynamic lubrication. With such friction combinations there is desired as a rule a very long life, i.e. low detrition, as well as a small friction which is independent of ambient conditions.

A carbon layer having a diamond-like crystal structure as a friction member against steel is known from published European application 22,285, which under vacuum or inert gas conditions has a particularly low coefficient of sliding friction $\mu$ and at the same time a high wear resistance and hardness; however, these carbon layers have the disadvantage that they do not have a low coefficient of sliding friction which is substantially independent of the relative air humidity.

It is therefore the object of the present invention to improve a carbon-containing sliding layer which has the function of a solid lubricant in such manner that it exhibits a low coefficient of sliding friction which is independent of the relative air humidity and moreover maintains the favourable properties of the known carbon layer, namely readily adheres in particular to steel, is wear resistant and hard and has a low coefficient of sliding friction against steel.

According to the invention this object is achieved in that the sliding layer comprises 50.1 to 99.9 at % of elemental carbon and 0.1 to 49.9 at % of at least one metallic element in a ratio which does not correspond to the stoichiometric ratio of a carbide.

According to advantageous modified embodiments of the invention the sliding layer comprises 60 to 97 in particular 80 to 95 at % of elemental carbon and 3 to 40, in particular 5 to 20 at % of at least one metallic element.

According to advantageous modified embodiments of the invention the metallic element is an element of group Ib, IIb, IIIa, IV, Vb, VIb, VIIb or VIII of the periodic table. Included are copper (Cu), silver (Ag), gold (Au), zinc (Zn), cadmium (Cd), boron (B), aluminium (Al), gallium (Ga), indium (In), thallium (Tl), silicon (Si), titanium (Ti), germanium (Ge), zirconium (Zr), tin (Sn), hafnium (Hf), lead (Pb), vanadium (V), niobium (Nb), tantalum (Ta), chromium (Cr), molybdenum (Mo), tungsten (W), manganese (Mn), rhenium (Re), iron (Fe), ruthenium (Ru), osmium (Os), cobalt (Co), rhodium (Rh), iridium (Ir), nickel (Ni), palladium (Pd) and platinum (Pt).

According to a further particularly advantageous embodiment of the invention the metallic element is tantalum, ruthenium, tungsten, iron or silicon.

A method of manufacturing said sliding layer is characterized in that it is deposited by chemical or physical vapour deposition on a substrate to be coated, in which in particular carbon and the selected metallic element(s) are deposited by means of cathode sputtering in an inert gas atmosphere.

Carbon and the selected metallic element(s) are deposited in particular by sputtering of a target formed from the selected metallic element(s) in an atmosphere of an inert gas and a hydrocarbon gas.

According to a particularly favourable embodiment of the method the deposition process is first started in an atmosphere which contains only an inert gas and the deposition process is then continued under an atmosphere of an inert gas—hydrocarbon gas. The advantage is that first a layer is deposited which consists only of the selected metallic element(s) which layer improves the adhesion, and that the actual sliding layer which comprises carbon in addition to the metallic elements is then deposited.

The invention is based on the recognition of the fact that the properties of the known carbon layer having a diamond-like structure which is good in itself as regards the friction ratio and adhesion to steel, in particular can still be improved when the carbon forming the layer is deposited or dispersed in elemental form in a matrix of metallic elements.

This matrix improves the hardness and decisively improves the adhesion of the carbon layer to the substrate. Within the scope of the invention a variety of metallic elements may be used for constructing a metal matrix in which the carbon is quasi incorporated, provided they can be applied to a substrate by means of chemical or physical vapour deposition. it is not necessary at all that the metallic element should be a known ductile metal described above for solid lubrication purposes.

Carbon alone shows comparatively different values for the sliding friction coefficient, for example, against steel in accordance with the relative humidity of the ambient atmosphere. The specific humidity-independent friction ratio of the layers according to the invention with respect to a friction member is determined in particular by the choice of the metallic element from the indicated groups of the periodic table as a matrix for the carbon.

Moreover this is decisive as to the adhesion of the layers to the required substrate, which is very essential for the use of mechanically stressed layers.

It is to be emphasized that the portion of the metallic element in the layer may at any rate not be greater than 49.9 at % since otherwise the desired properties of the sliding layer deteriorate decisively.

It has been found that substantially all metallic elements are suitable for use as a matrix in which the carbon of the sliding layer is incorporated in elemental form.

It is surprising that the metal matrix in combination with the carbon produces such excellent sliding layers of coefficient of sliding friction.

On the basis of the material properties of the individual components of said layer compositions said effect would not be expected at all in each case; the coefficients of sliding friction of steel members, including, for example, iron, are in the range from $\mu \approx 0.6$ to $\approx 1$ in a normal atmosphere. Iron would hence be a completely unsuitable material to form a lubricating layer against steel.

However, in combination with carbon preferably lower coefficients of sliding friction are produced with $\mu \approx 0.14$ in a normal atmosphere (50% relative air humidity).

The advantages which can be obtained by means of the invention consist in particular in that the sliding layers according to the invention are not only hard and wear-resistant and readily adhere to the substrate, but they also have a low sliding friction coefficient against steel which is substantially independent of the relative air humidity. A further advantage to be considered is that the sliding layers according to the invention can also reduce the detrition of tool surfaces due to their wear-resistance, so that they may be used as coating layers particularly for steel tools.

A particular advantage of the method of manufacturing the sliding layers according to the invention is to be considered in that, in a particularly simple manner and without interrupting the process, first a layer favouring the adhesion of the sliding layer can be deposited from the metallic element forming the matrix; just with respect to steel substrates, a very readily adhering optimum intermediate layer of a metallic element is obtained in this manner between the steel substrate and the actual sliding layer consisting of elemental carbon and at least one metallic element.

Within the scope of the invention, metallic elements are to be understood in a narrower sense to be those chemical elements which are light-impervious only in the solid state, show lustre as a result of a high light reflection power, are good current and heat conductors, can be plastically deformed by rolling, drawing, pressing, cutting and the like, and have atomic lattices. In a broader sense, however, the metallic elements are to be understood to include also the chemical elements which are not nonmetals and have pronounced metallic characteristics, for example, the elements sometimes referred to as semimetals and sometimes as metals such as silicon (compare, for example, Lueger, Lexikon der Technik, Deutsche Verlagsanstalt Stuttgart, 4th Edition 1961, Vol. 3, p. 636).

It is important to point out that the claimed layers do not relate to thermodynamically stable carbides, for example TiC or WC; the described layers are as a rule X-ray amorphous and can be manufactured in any desired composition. The carbon portion required for low friction values lies considerably above the stoichiometrically exact composition required for a chemical compound—very low coefficients of sliding friction are often achieved only with 80–95 at %. Moreover, many of the claimed layer compositions are known as stable carbides (for example, Ru-C). The stable carbides (for example, TiC, WC) show coefficients of sliding friction against steel as a friction member of $\mu \approx 0.2$ to 0.4, which are considerably above the values which the claimed layers show. For W-C layers manufactured within the scope of the invention and having 91 at % carbon and 9 at % tungsten a coefficient of sliding friction $\mu \approx 0.14$ was measured at a relative air humidity of 50% with steel as a friction member, and a cofficient of sliding friction $\mu \approx 0.06$ as measured with a second W-C layer of the same composition as a friction member.

Thus, the layers according to the invention are of great importance as lubricating and protective layers, for example, for sliding bearings and oscillating friction combinations (for example, shaving heads of electrical shaving apparatuses) or knives, for example, for cutting metal plates.

The invention will now be described with reference to the accompanying drawing, in which the FIGURE is a sectional view of a sliding layer provided on a substrate with an intermediate layer promoting its adhesion to the substrate.

1. Manufacture of iron-carbon layers

The FIGURE is a sectional view of a substrate 1, for example, of chromium-nickel steel, having an adhesion-promoting intermediate layer 3 of pure iron and a sliding layer 5 of iron and carbon. These layers can be obtained, for example, as follows: layers having a thickness of 0.9 $\mu$m and a micro hardness of $15 \times 10^3$ N/mm$^2$ were manufactured by cathode sputtering of a pure iron target in an atmosphere of an inert gas at a pressure of 20 mbar, for example argon, and a hydrocarbon gas at a pressure of 0.2 mbar, for example, acetylene. Flat rings of 100 Cr6 steel served as a substrate. The layers comprising approximately 20 at % iron, 78 at % carbon and the remainder unknown impurities (it is assumed that the latter derives from the atmosphere of the cathode sputtering process), have an excellent adhesion to their substrate, which is due inter alia to the fact that during the first minutes of the coating process the cathode sputtering process was carried out in a pure inert gas atmosphere so that first a pure iron layer was deposited. The further coating then occurred in the above-mentioned atmosphere. The layers thus manufactured have a sliding friction coefficient in a dry atmosphere (<0.1% relative humidity) of $\mu \approx 0.06$ and in a moist atmosphere ($\approx 80\%$ relative humidity) of $\mu \approx 0.15$.

Layers which were manufactured by sputtering of an iron target and an iron carbon target, respectively, in an inert gas-hydrocarbon gas atmosphere, have a hardness in the range from $15 \times 10^3$ to $30 \times 10^3$ N/mm$^2$ (Knoop hardness). The sliding friction coefficients against steel as a friction member as a rule are in the range from $\mu \approx 0.05$ to 0.3 depending on the coating conditions. For example, for a layer which contains <49.9 at % iron as well as >50.1 at % carbon a coefficient of sliding friction which is far less dependent on the relative air humidity can be achieved than is the case for pure carbon layers. For pure carbon the values for the coefficient of sliding friction $\mu$ against steel with a relative air humidity of <0.1% are $\mu \approx 0.02$ and with a relative air humidity of 95% $\mu \approx 0.2$.

An iron-carbon layer of a different composition, namely 84 at % carbon and 16 at % iron, was manufactured under the same conditions and with a relative air humidity of 50% had sliding friction coefficients $\mu \approx 0.14$ both against steel and also against a layer of the same composition as a friction member (compare Table 4).

In principle the compositions of the layers with respect to the quantities of carbon and metallic element(s) can be controlled by the target composition and by the amount of the hydrocarbon gas, respectively, in the sputtering atmosphere, for example in the sense that, when the concentration of the carbon in the layer is to be higher, the amount of the hydrocarbon gas in the sputtering atmosphere is increased accordingly. The exact ratios can be determined by simple experiments.

Table 1 illustrates how the coefficient of sliding friction $\mu$ for iron-carbon layers containing 3.7 at % iron, 95.5 at % carbon and 0.8 at % residual gas with a friction member in the form of a layer of the same composition as well as with steel as a friction member is influenced by different relative air humidities.

TABLE 1

| Sliding layer | Relative air humidity (%) | $\mu_1$ | $\mu_2$ |
|---|---|---|---|
| 3.7 at % Fe | 90 | 0.15 | 0.13 |
| + | 50 | 0.14 | 0.12 |
| 95.5 at % C | 10 | 0.13 | 0.11 |
| + | 1 | 0.07 | 0.07 |
| 0.8 at % residual gas | <0.4 | 0.04 | 0.05 |

$\mu_1$ = coefficient of friction with a friction member in the form of a layer of the same composition as the sliding layer.
$\mu_2$ = coefficient of friction against steel as a friction member.

Further compositions in the range from 65.2 to 95.5 at % carbon and 32.9 to 2.3 at % iron with the remainder, consisting of gases incorporated in the resulting layer in the cathode sputtering process were tested for their friction behaviour (compare Table 2). The layers were manufactured under the same parameters as indicated for the above-described iron-carbon layer. Coefficients of sliding friction $\mu$ from $\approx 0.10$ to $\approx 0.17$ in an atmosphere with 50% relative air humidity with steel as a friction member and values for $\mu$ from $\approx 0.13$ to $\approx 0.22$ against a layer of the same composition as a friction member were measured. The layer compositions and the associated coefficients of sliding friction are set forth in Table 2.

TABLE 2

| Fe (at %) | C (at %) | Residual gases (at %) | $\mu_1$ | $\mu_2$ |
|---|---|---|---|---|
| 2.3 | 93 | 4.7 | 0.16 | 0.16 |
| 3.7 | 95.5 | 0.8 | 0.14 | 0.12 |
| 14.8 | 78.1 | 7.1 | 0.14 | 0.17 |
| 20.3 | 78.7 | 1.0 | 0.13 | 0.15 |
| 32.9 | 65.2 | 1.9 | 0.22 | 0.10 |

$\mu_1$ = coefficient of friction with 50% relative air humidity and a friction member in the form of a layer of the same composition as the sliding layer.
$\mu_2$ = coefficient of friction with 50% relative air humidity and steel as a friction memeber.

2. Manufacture of a tantalum-carbon layer

As in the example of the iron-carbon layer, layers having a thickness of 0.9 $\mu$m were manufactured by cathode sputtering of a pure tantalum target in an atmosphere of an inert gas at a pressure of 20 mbar, for example, argon, and a hydrocarbon gas at a pressure of 0.2 to 1.0 mbar, for example, acetylene. As a substrate there were used steel rings or silicon monocrystalline disks.

The layers with 95 at % carbon and 5 at % tantalum in an atmosphere of a relative air humidity of 50% have a coefficient of sliding friction against steel of $\mu \approx 0.08$ and against a layer of the same composition as a friction member of $\mu \approx 0.03$ (compare Table 4).

3. Manufacture of a ruthenium-carbon layer

Layers having a thickness of 0.9 $\mu$m were manufactured by cathode sputtering of a pure ruthenium target in an atmosphere of an inert gas at a pressure of 20 mbar, for example argon, and a hydrocarbon gas at a pressure of 0.2 to 1.0 mbar, for example, acetylene. As substrates there were used steel rings or silicon monocrystalline disks.

A layer which comprises 18 at % ruthenium and 82 at % carbon has a sliding friction coefficient in an atmosphere with 50% relative air humidity of $\mu \approx 0.05$ with steel as a friction member and of $\mu \approx 0.03$ with a layer of the same composition as a friction partner (compare Table 4).

4. Manufacture of a tungsten-carbon layers

Layers having a thickness of 0.9 μm and a micro hardness of $21 \times 10^3$ N/mm² were manufactured by cathode sputtering of a pure tungsten target in an atmosphere of an inert gas at a pressure of 20 mbar, for example, argon and a hydrocarbon gas at a pessure of 0.2 to 1.0 mbar, for example, acetylene. As substrates there were used steel rings or silicon monocrystalline discs.

A layer containing 9 at % tungsten and 91 at % carbon has a sliding friction coefficient in an atmosphere with 50% relative air humidity of $\mu \approx 0.14$ with steel as a friction member and of $\mu \approx 0.06$ with a layer of the same composition as a friction member (compare Table 4).

Further compositions in the range of 66.2 to 96.5 at % carbon and 30.6 to 1.6 at % tungsten with the remainder consisting of gases incorporated in the resulting layer during the cathode sputtering process were tested for their friction behaviour (compare Table 3). The layers were manufactured under the same parameters as described above for the iron-carbon layers, tantalum-carbon layers and ruthenium-carbon layers. Coefficients of sliding friction $\mu$ from $\approx 0.10$ to 26 0.17 in an atmosphere with 50% relative air humidity with steel as a friction member were measured. The layer compositions and the associated coefficients of sliding friction are set forth in Table 3.

Table 3 also includes a layer composition having 59.3 at % tungten, 36.7 at % carbon and 4.0 at % residual gas from the cathode sputtering atmosphere; said layer composition is beyond the claimed range of compositions. It had a poor adhesion to the substrate, a high detrition in friction tests and coefficient of sliding friction $\mu \approx 0.4$ with steel as a friction member in an atmosphere with 50% relative air humidity.

The tungsten-carbon layers set forth in Table 3 illustrate that the coefficient of sliding friction of the sliding layers decreases with increasing carbon portion.

TABLE 3

| W (at %) | C (at %) | Residual gases (at %) | $\mu_2$ | Remarks |
|---|---|---|---|---|
| 1.6 | 94.5 | 3.9 | 0.17 | |
| 2.8 | 96.5 | 0.7 | 0.10 | |
| 4.9 | 95 | 0.1 | 0.13 | |
| 5.3 | 92.9 | 1.8 | 0.16 | |
| 8.9 | 90.3 | 0.8 | 0.14 | |
| 30.6 | 66.2 | 3.2 | 0.14 | hardness 30 × 10³ N/mm² |
| 59.3 | 36.7 | 4.0 | ~0.4 | very high detrition |

$\mu_2$ = coefficient of friction with 50% relative air humidity and steel as a friction member.

5. Manufacture of a silicon-carbon layer

Layers having a thickness of 0.9 μm were manufactured by cathode sputtering of a pure silicon target in an atmosphere of an inert gas at a pressure of 20 mbar, for example, argon, and a hydrocarbon gas at a pressure of 0.2 to 1.0 mbar, for example, acetylene. Steel rings or silicon monocrystalline discs also served as substrates.

The layers comprising 20 to 5 at % silicon and 80 to 95 at % carbon have a sliding friction coefficient against steel in an atmosphere with 50% relative air humidity of $\mu \approx 0.07$ (compare Table 4).

TABLE 4

| Sliding layer (composition) | Carbon (at %) | Metallic element (at %) | $\mu_1$ | $\mu_2$ |
|---|---|---|---|---|
| Si—C | 80–95 | 20–5 | — | 0.07 |
| Ta—C | 95 | 5 | 0.03 | 0.08 |
| W—C | 91 | 9 | 0.06 | 0.14 |
| Ru—C | 82 | 18 | 0.03 | 0.05 |
| Fe—C | 84 | 16 | 0.14 | 0.14 |

$\mu_1$ = coefficient of friction at 50% relative air humidity and a friction member in the form of a layer of the same composition as the sliding layer.
$\mu_2$ = coefficient of friction at 50% relative air humidity and steel as a friction member.

Table 5 below indicates how the coefficient of sliding friction $\mu$ for a tungsten-carbon layer containing 1.6 at % tungsten, 94.5 at % carbon and 3.9 at % residual gas with a friction member in the form of a layer of the same composition as well as with steel as a friction member is influenced by different relative air humidities.

TABLE 5

| Sliding layer (composition) | Relative air humidity (%) | $\mu_1$ | $\mu_2$ |
|---|---|---|---|
| 1.6 at % W | 90 | 0.10 | 0.16 |
| + | 50 | 0.08 | 0.12 |
| 94.5 at % C | 10 | 0.06 | 0.07 |
| + | 1 | 0.02 | 0.05 |
| 3.9 at % residual gas | <0.4 | 0.01 | 0.02 |

$\mu_1$ = coefficient of friction with a friction member in the form of a layer of the same composition as the sliding layer
$\mu_2$ = coefficient of friction against steel as a friction member.

What is claimed is:

1. A workpiece comprising a substrate having a sliding surface provided with a friction-reducing coating; said coating consisting essentially of elemental carbon dispersed in a matrix formed of at least one metallic element in the proportions of 50.1 to 99.9 at % of the elemental carbon and 0.1 to 49.9 at % of the metallic element, the ratio of the metallic element to the elemental carbon differing from the stoichiometric ratio of a carbide.

2. A workpiece according to claim 1, in which the substrate is metallic.

3. A workpiece according to claim 1, in which the coating consists essentially of 60 to 97 at % of elemental carbon and 40 to 3 at % of at least one metallic element.

4. A workpiece according to claim 3, in which the coating consists essentially of 80 to 95 at % of elemental carbon and 20 to 5 at % of at least one metallic element.

5. A workpiece according to claim 1, in which the metallic element is an element of group Ib, IIb, IIIa, IV, Vb, VIb, VIIb or VIII of the periodic table.

6. A workpiece according to claim 5, in which the metallic element is silicon, tantalum, tungsten, ruthenium or iron.

7. A method of making a workpiece according to claim 1, which includes coating the sliding surface of the substrate by chemical or physical vapour deposition of the elemental carbon and the metallic element.

8. A method according to claim 7, which includes depositing the elemental carbon and the metallic element by cathode sputtering of a target formed from carbon and the metallic element.

9. A method according to claim 7, which includes depositing the elemental carbon and the metallic element by cathode sputtering of a target formed from the metallic element in an atmosphere of an inert gas and a hydrocarbon gas.

10. A method according to claim 9, which includes starting the deposition in an atmosphere containing only the inert gas and then continuing the deposition under an inert gas-hydrocarbon gas atmosphere.

11. A method according to claim 9, in which the inert gas comprises argon.

12. A method according to claim 9, in which the hydrocarbon gas comprises acetylene.

* * * * *